Nov. 22, 1938.　　　　V. GRGICH　　　　2,137,648
CHAIN-LINK JOINT WELD IRONER
Filed March 16, 1936
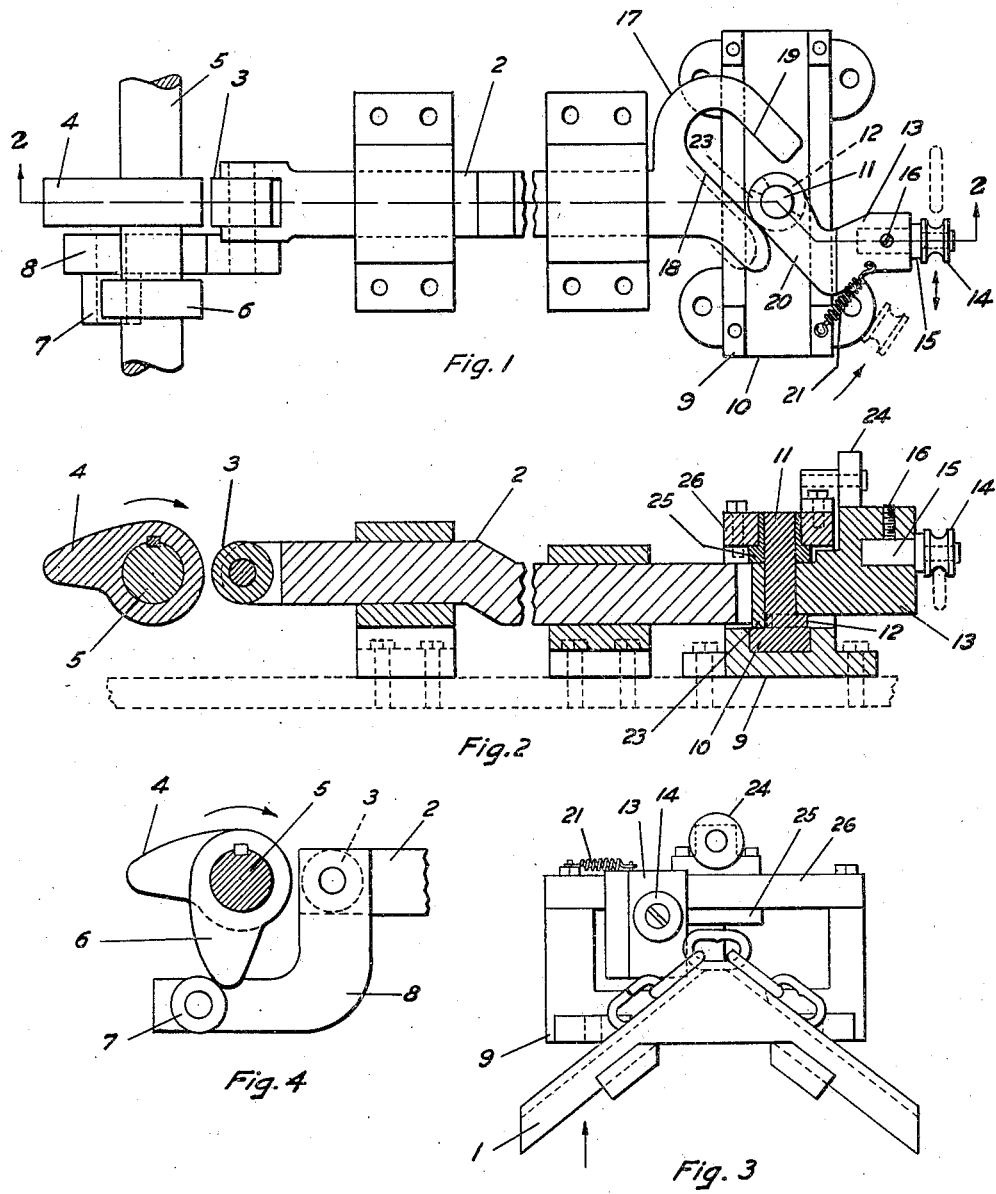
INVENTOR.
Velemir Grgich
BY　W. S. Babcock
ATTORNEY.

Patented Nov. 22, 1938

2,137,648

UNITED STATES PATENT OFFICE 2,137,648

CHAIN-LINK JOINT WELD IRONER

Velemir Grgich, Columbus, Ohio

Application March 16, 1936, Serial No. 69,009

24 Claims. (Cl. 59—35)

The invention to be hereinafter described relates to chain-link joint weld ironers.

There is a tremendous tonnage of welded chain produced daily, for a wide variety of industries and uses. The greater part of this chain is made by the usual and well known methods of first making a chain in which the links are all, individually, completed and interconnected, except that the link ends of each link are not connected; or, a chain in which the various links are split— i. e. the ends, falling at the mid-length, are disconnected—, and then welding the disconnected ends together. One of the commonest types of chains and one which is produced in large quantities, is that in which the links are substantially elliptical in shape and are arranged alternately at right angles to each other. It is common practice to run such chains through two successive welding machines, the first machine welding the ends of the links lying in one direction and the next welding those lying at right angles thereto. This is a well known and thoroughly understood electric welding operation, familiar to all experienced chain manufacturers. Of course, the individual chain links are gripped and held while being welded, in well known manner.

As is well known, every weld so made (one for every link) leaves a ragged, rough and rigid fin or rib of tough solid metal extending outwardly from the weld, at the mid-length, of the link. Before the chain may be used, this fin must be completely removed, requiring further operations and equipment or attachments. One method of removal is by a reciprocating blade or planer so positioned and timed as to plane off the rib. This leaves a rough and unfinished surface like a file which is entirely unsatisfactory, from a commercial point of view. Another difficulty of this method lies in the fact that the link bar is round in cross section which makes it impossible for the planer blade to remove the fin down to the bar except at the one point tangent to the circumference. An appreciable projection or portion of the fin remains at either side of the joint. A further and very serious objection is that the cutting off of the fin weakened the connection, at the weld. So, such method is entirely unsatisfactory in many serious ways.

In order to produce a thoroughly acceptable and commercially practical chain which will be free running, and as strong or stronger at the welded surfaces, the exposed weld surfaces at the outer side of the links must be perfectly smooth and the metal must be whole and uncut. The chain will then be smooth, free running, and have full strength, so that it will not tear apart or break at the weld.

The electric welding of chain links has been long known. The welding machines and their various mechanisms for rocking the welding unit toward the chain while, at the same time raising the chain toward the unit, clamping each link securely in place as it reaches the welding position and while being welded, and feeding the chain past the welding unit, are all well understood in this art and it is unnecessary to burden this application with any of them. It is amply sufficient to briefly call attention to the fact that such mechanisms are in use by and in the machines to which the present invention is adapted to be and intended to be applied.

The present invention has been devised for application to and cooperation with such machines.

As a weld is completed and the welder with its "coppers" or electrodes rocks back, a ragged fin or rib projects vertically upward from the joint or center of the side of the link.

Several devices and operations have been used to meet this difficulty to a greater or less degree. One is the knife, shear or planer above mentioned. It is so set as to be driven across the weld to cut the fin off flush with the link body. This planer moves horizontally across the link, at its weld, at right angles to its length. By the time that the link has reached the planer, the weld has hardened and the planer must operate to cut, practically cold, metal. The power required is much greater than should be necessary and the hardness of the metal contributes to the rough file-like surface left.

Another type of mechanism attempting to smooth the weld is that of a vertically reciprocating die. It stamps down from above about the weld. It interferes considerably with the other operating mechanism. It compresses the metal in a narrow band half-way around the link, but has no smoothing or ironing action molding the soft red hot metal around and about the outer surface of the weld joint.

The above and many other objections and difficulties have been completely eliminated by the present invention which provides a simple, efficient, economical and compact device and mechanism whereby every link weld may be quickly and definitely ironed out smooth and even and all roughness removed, by a rolling ironing movement applied longitudinally along the link and over the weld joint while the metal is still very soft and plastic from the heat of the welding, so that all excess metal is molded smoothly around and about the joint to reinforce and strengthen the weld so that a link so finished is, actually, stronger at the weld joint than at any other point.

In order to more clearly disclose the construction, operation and use of the invention, reference should be had to the accompanying drawing forming part of this application. Throughout the several figures of the drawing, like reference characters designate the same parts in the several views.

In the drawing:—

Fig. 1 is a top plan view of the invention, assembled as it would be mounted on a link welding machine, but with its top plate and guide block omitted, for clearness;

Fig. 2 is a central longitudinal cross section of Fig. 1, on line 2—2, with part of the machine base plate indicated;

Fig. 3 is a right hand end view of Fig. 1; and

Fig. 4 is a side elevation of the actuating cams, in the positions of Figs. 1 and 2.

The body of the chain link is, of course, round in cross section and the link is elliptical in shape. To adequately iron out any irregularities in such a surface, the ironer must contact the entire surface of the contour adjacent the weld. A grooved roller is the most effective means of making such a contact. As previously stated, the chain support rises to bring the particular link into welding position and contact with the "coppers", as the welder rocks downward, the two being so timed as to meet at the desired predetermined point, then, after welding, the welder rocks back slightly, while the chain supports remain raised for the finishing or ironing operation. To efficiently perform this operation, the ironer is moved longitudinally of the link. On the other hand it must not remain, when not in use, in a position to interfere with other devices operating on the link, especially the "coppers" or electrodes, for instance. Consequently it is retracted after each complete reciprocation or operation. The simplest and most efficient movement to accomplish the result is a short arcuate swing terminating, forward, at a point in line with the length of the link and, rearwardly, in full retracted position, the forward swing being followed by the reciprocating ironing movement. At the end of the forward movement or swing, the ironer is reciprocated the full length of the link and then retracted, as will later appear. That completes the ironing operation.

On the bed plate of the machine, approximately in line with the high point or apex of the usual chain support and guide 1 is a reciprocable bar 2, suitable bearing plates or blocks being provided to reliably maintain its direction and position and, for that purpose, being removably though firmly and solidly bolted or similarly secured in place on the machine bed plate. To minimize friction, the rear end of this bar is provided with an antifriction roller 3 or other like device which is engaged by the actuating cam 4 on a power shaft 5 of the machine. Engagement of cam 4 with roller 3, as shaft 5 revolves, drives bar 2 toward the front of the machine. It is retracted by a second cam 6 on the same shaft, which engages an antifriction roller 7 on the arm 8 which is connected to the bar 2 and straddles shaft 5 in such position that engagement of cam 6 with roller 7, as the shaft rotates, will retract bar 2. In this way, bar 2 will be reciprocated.

This back to front reciprocation of the bar 2 is translated into a reciprocation at right angles thereto, near the front of the machine, below the welding unit. Near the front and parallel with it, is securely fastened a guide block or channel 9 in which is reciprocably and slidably mounted a bar 10 carrying at its mid-length a pivot post 11, about the base of which is an arcuate shoulder 12, for a purpose to be later disclosed. On post 11 is journaled an elbow 13 carrying on its free end the grooved ironing roller 14. In order that these rollers may be changed as desired, for different sizes, repair, etc., a small stub shaft 15 is provided. The roller is journaled on one end and the other end is seated in a socket of the elbow 13 and removably secured in place by a set screw 16 or the like. Elbow 13 is of such length that, when projected to operative position, it will bring the groove of roller 14 directly in line with and immediately above the center line of the chain at the high point of the chain support 1. The forward end of the bar 2 is provided with a U-yoke 17 disposed diagonally, relatively to the direction of travel of the bar 2 and, also, diagonally relatively to the direction of travel of bar 10. It is so positioned that, as the bar 2 moves forward the longer inner face 18 of the forward thrusting branch will engage the journal portion of elbow 13 and force the elbow at right angles, in one direction, to the travel of bar 2, while, as bar 2 moves rearward, the shorter inner face 19 of the other branch will engage the journal portion of elbow 13, from the opposite direction, and force the elbow at right angles in the opposite direction. Actually, yoke 17 acts as two cams, as will be obvious.

As stated above, elbow 13 is journaled or pivoted on post 11 to swing thereabout. It will be noticed that the back 20 of the elbow 13 is straight and is so disposed that, when the ironing roller 14 is projected into operative position, as in Fig. 1 (full lines), it is in alignment with and partly engaging the adjacent wall 18 of the U-yoke. This coinciding of straight surfaces locks elbow 13 in its projected or operative position and prevents any swing about pivot post 11 in either direction. This lock is complete and effective from the instant that the forward travel of bar 2 by engaging face 18 with elbow 13 brings the straight edge or face 20 of the elbow into coincidence with wall 18. From that instant, elbow 13, locked in its operative position, is carried lengthwise across the red hot weld in a rolling ironing action which completely smooths all roughness, compresses the metal and leaves a joint so uniform and smooth and so thoroughly merged in the link body that it can hardly be detected. As the forward stroke of bar 2 is completed and the rear stroke starts, the pull of coil spring 21 will maintain the straight face or wall 20 of elbow 13 snug against wall 18, as wall 19 engages the elbow from the opposite direction or side and reverses the direction of its travel. This gives the reverse ironing stroke. Each weld receives two smoothing or rolling-ironing strokes of the ironing roller 14—one forward and one reverse.

At the end of the return stroke, as the bar 2 continues rearwardly, the face 18 moves slightly from the wall 20, enabling spring 21 to swing the elbow 13 inwardly about its pivot 11 into the full retracted position, back behind the front line of the machine base and frame and out of the way of the operating parts. This position is indicated in dotted lines in Fig. 1. This rearward or retraction position of swing is limited, in well known manner by segmental shoulder 23 on arm 13, concentric with its journal and so positioned as to be engaged by shoulder 12 on post 11, as arm 13 reaches full retracted position.

It follows that in the next forward movement of bar 2, it first engages arm 13 and swings it from the dotted line or retracted position to the full line, locked, operative position (as in Fig. 1), and then carries it through the operations previously described.

There is considerable pressure involved in this ironing stroke and the ironing roller 14 is on the end of a lever, increasing that reaction pressure. To counteract this strain, as far as practical a back-up or resistance roller 24 is provided. It is mounted in a small bracket securely fastened to the stationary casting in which the elbow 13 travels. Roller 24 is so positioned that it falls directly above the outer free end of elbow 13 at the instant that the roller 14 starts its first stroke. The lower edge of the roller just contacts the upper surface of the elbow. Consequently, any upward force on the lever, due to the roller 14 riding over the swell of the weld, is transmitted to and taken up by roller 24, thereby holding the ironing roller 14 forcefully down to its ironing operation.

The block 10 is retained in its channel by the usual filler and guide block 25 and the cap plate 26, in well known manner, the filler and guide block reciprocating freely with the pivot post 11.

The positions of cams 4 and 6 on shaft 5, of course, control the time of operation of the ironing roller 14. They are timed or spaced to operate in proper relation to the other operations of the machine, as will be readily understood. Preferably, though not necessarily, they are so spaced, relatively to each other, as to cause the start of the return stroke at the instant that the forward stroke has been completed, though that is not absolutely essential to the success of the operation of this invention. There could, with no serious objection, be a slight pause between completion of the forward stroke and start of the return stroke. That is partly a matter of choice and partly dependent upon the timing of the other operations of the machine, all as will be clearly understood.

It is thought that the construction, operation and use of the invention will be clear from the preceding detailed description.

Many changes may be made in the construction, arrangement and disposition of the various parts of the invention, within the scope of the appended claims, without in any way departing from the field of the invention and it is meant to include all such within this application wherein only one preferred form has been illustrated by way of example and with no intention to in any degree limit the claims to the invention by such illustration.

Having thus described my invention, what I claim and desire to protect by Letters Patent is:

1. A link joint weld ironer comprising, a link support exterior to a link, an ironing device also exterior to the same link and means for moving said ironing device longitudinally of a link across the joint weld of a link on said support.

2. A link joint weld ironer, comprising, a link support exterior to a link, an ironing roller also exterior to the same link and means for moving said ironing roller longitudinally of a link across the joint weld of a link on said support.

3. A link joint weld ironer comprising, a link support exterior to a link, a grooved ironing roller also exterior to the same link and means for moving said grooved ironing roller longitudinally of a link across a joint weld of a link on said support, the groove in said roller embracing the link weld during such movement.

4. A link joint weld ironer comprising, a link support, an ironing device, and means for reciprocating said ironing device longitudinally of a link across the weld joint of a link on said support.

5. A link joint weld ironer comprising, a link support, an ironing device, means for moving said ironing device longitudinally of a link across the weld joint of a link on said support, and means engaging said ironing device to resist the strains thereon.

6. A link joint weld ironer comprising, a link support exterior to a link, an ironing device also exterior to the same link, means for moving said ironing device longitudinally of a link across the weld joint of a link on said support, and means for retracting said ironing device after completion of the ironing operation.

7. A link joint weld ironer comprising, a link support, a grooved ironing roller, means for reciprocating said roller longitudinally of a link, across the weld joint of a link on said support, means holding said roller down against reaction strains during reciprocation, and means for retracting said roller to inoperative position upon completion of the ironing operation.

8. A link joint weld ironer comprising, means for supporting a link in a stationary relation, an ironing device, and means for moving said ironing device longitudinally of a link across the joint weld thereof on said support while said link is stationary.

9. A link joint weld ironer comprising, a link support exterior to a link, an ironing device also exterior to the same link, means for moving said ironing device longitudinally of a link across the weld of a link on said support, and means for retracting said ironing device to inoperative position upon completion of the ironing operation.

10. A link joint weld ironer comprising, a link support, a block longitudinally movable relatively to said support, an arm carried by said block, a link weld ironer carried by said arm, and means for moving said block to carry said arm across the weld of said link.

11. A link joint weld ironer comprising a link support, a block longitudinally movable relatively to said support, an arm movably carried by said block, a link weld ironer carried by said arm, means for moving said arm to link-weld ironing position, and means for moving said block, arm, and ironing device longitudinally of said chain link weld.

12. A link joint weld ironer comprising a link support, a block longitudinally movable relative to said support, an arm carried by said block and movable relatively thereto, an ironing device carried by said arm and adapted to iron a link joint weld, means for swinging said arm to ironing position, and means for moving said block to effect the ironing operation.

13. A link joint weld ironer comprising, a link support, a block reciprocable relatively thereto, an arm carried by said block and movable relatively thereto, an ironing device carried by said arm and adapted to iron a link joint weld, means for swinging said arm to ironing position, means for moving said block to effect the ironing operation, means for returning said block, and means for retracting said arm.

14. A link joint weld ironer comprising, a link support, an ironing device, means for reciprocating said ironing device longitudinally of a link across the weld joint of a link on said support, and means for retracting said ironing device after completion of the ironing operation.

15. A link joint weld ironer comprising, a link support, an ironing device, means for reciprocating said ironing device longitudinally of a link across the joint weld of a link on said support, and means engaging said ironing device to resist the strains thereon.

16. A link joint weld ironer comprising, a link support, a reciprocable bar, a block reciprocable by and at an angle to the travel of said bar, and an ironing device carried by said block and adapted to engage and iron a link weld.

17. A link joint weld ironer comprising a link support, a reciprocable bar, a block reciprocable by and at an angle to the travel of said bar, an arm movably mounted on said block and carrying an ironing device adapted to engage and iron a link weld, means carried by said bar and engaging and actuating said arm to ironing position, and means retracting said arm to inoperative position on completion of the ironing operation.

18. A link joint weld ironer comprising, a link support, an ironing device, one of said elements being movable longitudinally relatively to the other, and means for moving said movable element to effect an ironing operation.

19. A method of link weld finishing comprising, compressing the metal of a link weld both radially and longitudinally while heat-softened with a longitudinally reciprocating motion.

20. A method of link weld finishing comprising, compressing the metal of a link weld both radially and longitudinally with a longitudinally reciprocating motion.

21. A method of link weld finishing comprising, simultaneously compressing the metal of a link weld both radially and longitudinally with a longitudinally reciprocating motion.

22. In a machine for welding chain links, a movable swaging member engageable with the outer side of the link, containing a welded joint, a cam shaft, and means actuated by said cam shaft for moving said swaging member lengthwise over the outer side of that portion of the link containing the welded joint.

23. In a machine for electrically welding chain links, a swaging instrumentality for removing displaced metal from the outer side of a welded chain link, a holder for said instrumentality, and means imparting oscillating movement to said holder and instrumentality when first moved from an inactive position into engagement with a welded chain link and longitudinally and linearly of said link following initial engagement therewith.

24. In a machine for electrically welding chain, a reciprocatory bar, cam means for imparting intermittent sliding movement to said bar, one end of said bar being provided with an angularly directed slot, a pivotally and slidably movable arm cooperative with the slotted end of said bar and a swaging roller carried by said arm.

VELEMIR GRGICH.